G. E. HOLMES AND J. M. AND A. G. BOSTROM.
SIDE CURTAIN DOOR.
APPLICATION FILED DEC. 22, 1920.
1,416,028. Patented May 16, 1922.
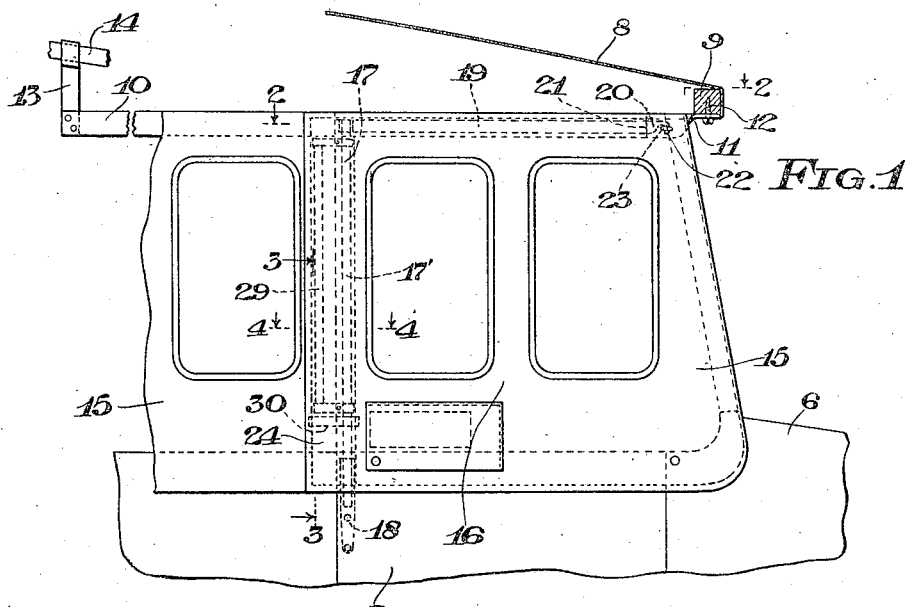
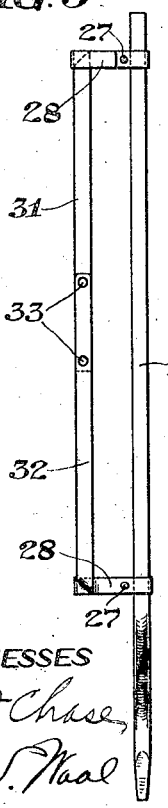
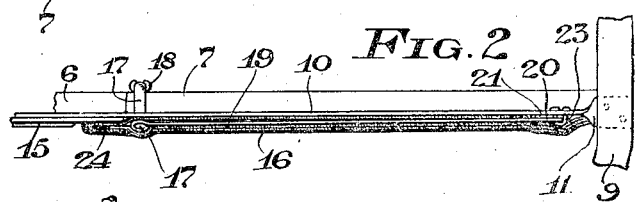
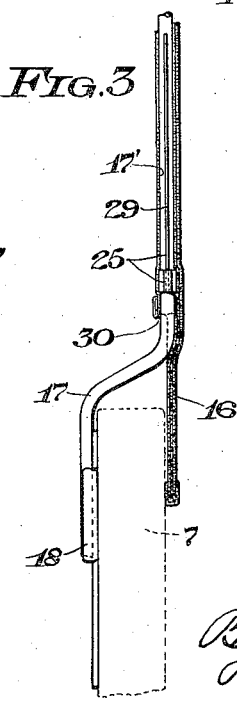
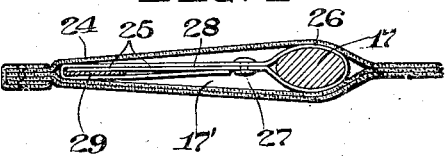
WITNESSES
H. D. Chase
C. S. Naal
INVENTORS
Gustav E. Holmes,
John M. Bostrom &
Axel G. Bostrom,
By R. S. Caldwell
ATTORNEY.

UNITED STATES PATENT OFFICE.

GUSTAV E. HOLMES, JOHN M. BOSTROM, AND AXEL G. BOSTROM, OF MILWAUKEE, WISCONSIN.

SIDE-CURTAIN DOOR.

1,416,028.  Specification of Letters Patent.  Patented May 16, 1922.

Application filed December 22, 1920. Serial No. 432,492.

*To all whom it may concern:*

Be it known that we, GUSTAV E. HOLMES, JOHN M. BOSTROM, and AXEL G. BOSTROM, citizens of the United States, and residents of Milwaukee, in the county of Milwaukee and State of Wisconsin, have invented new and useful Improvements in Side-Curtain Doors, of which the following is a description, reference being had to the accompanying drawings, which are a part of this specification.

This invention relates to automobile enclosures and more particularly to the door construction of such enclosures.

In this art it is common practice to permit the door portion of the curtain to overlap the side curtain adjacent thereto and the object of such construction is to provide a weatherproof closure when the door is closed, but actual experience has demonstrated that the overlapping side edge of the door portion of the curtain does not maintain its shape and does not, therefore, lie flat against the adjacent curtain to form a weatherproof seal. It is, therefore, one of the objects of this invention to overcome this difficulty by the provision of a metal reinforcement for the side flap, and more particularly a reinforcement for this flap which is carried by the door rod.

The invention further consists in the several features hereinafter set forth and more particularly defined by the claims at the conclusion hereof.

In the drawings: Fig. 1 is an elevation view of a curtain construction embodying the invention showing it applied to an automobile; Fig. 2 is a section taken on the line 2—2 of Fig. 1; Fig. 3 is a section taken on the line 3—3 of Fig. 1; Fig. 4 is an enlarged section taken on the line 4—4 of Fig. 1, and Fig. 5 is a detail view of the curtain reinforcement.

In the drawings the numeral 6 designates the body of the automobile provided with the usual doors 7 and having a top 8 including the usual front bow 9. On each side of the top 8, which is usually of the folding character, we provide bars 10 which are twisted at their front ends 11 so as to be secured to the bow 9 by screws 12 and which extend rearwardly to a position adjacent the rear curtain of the automobile, not specifically shown, where they may be secured in any suitable manner to the top construction, as by a hook 13 connected to a brace 14. These bars each are of greater height than width and have side curtains 15 secured thereto.

Each side curtain in its construction embodies a door portion 16 which is provided with an upper hinge so as to turn with the automobile door 7 upon which it is supported. A door rod 17 mounted in a socket 18 on the automobile door is disposed within a pocket 17' in the door portion 16 of the curtain and connected at its upper end to a hinge bar 19 which is also disposed inside of the curtain, but has its forward end 20 passed through a slot 21 in the curtain, this exposed end being provided with a hook 22 to engage an eye or stationary hinge part 23 formed by a U-bolt which is secured to the bar 10. Those portions of the curtain other than the door portion are secured to the body of the automobile in a suitable manner by the usual fasteners. The rods 17 and 19 thus form a supporting frame-work for the door section 16 of the curtain, the flap 24 of which overlaps the adjacent curtain.

In order that the overlapping side edge 24 of the door portion of the curtain may properly engage the adjacent curtain and maintain a weathertight closure, we have provided a metal reinforcement for this edge or flap consisting, as shown in Figs. 1, 3 and 4, of a single piece of strap iron 25 having its ends 26 bent into loops surrounding the door rods 17 and clamped thereto by rivets 27 and having laterally extending portions 28 and a vertically extending portion 29, said reinforcing member being mounted in the same pocket 17' which receives the rod 17, an opening 30 being formed in the curtain for this purpose. The laterally extending portions 28 are formed by bending these parts of the reinforcing member at right angles to the vertically disposed portion 29. The vertically disposed portion 29 extends close to the outer edge of the flap 24 and where the make of car is known it may be made, as previously stated, in only one piece, but where the curtain fixtures are to be furnished to the trade for use in connection with different automobiles the reinforcing member is formed of two similar pieces 31 and 32 which are secured together after they have been adjusted to the proper length with respect to each other by means of rivets 33, as shown in Fig. 5.

We desire it to be understood that this invention is not limited to any specific form or arrangement of parts except in so far as such limitations are specified in the claims.

What we claim as our invention is:

1. In an automobile enclosure, the combination of a side curtain having a door portion with a sealing flap along its opening side edge, a door rod connected to the door of the automobile and mounted in the curtain, a reinforcing member having spaced laterally extending portions provided with looped ends surrounding and clamped to said door rod, and a vertically extending portion connecting said laterally extending portions and disposed within said door portion to reinforce the outer edge, top and bottom portions of said flap.

2. In an automobile enclosure, the combination of a side curtain having a door portion with a sealing flap along its opening side edge, a door rod connected to the door of the automobile and mounted in the curtain, a two-part reinforcing member, each part of which has a laterally extending portion connected to said rod and a vertically extending portion, means for adjustably connecting the vertically extending portions of said parts together, said reinforcing member being mounted within said sealing flap to reinforce the same.

3. In an automobile enclosure, the combination of a side curtain having a door portion with a sealing flap along its opening side edge, a door rod for the curtain connected to the door of the automobile, and a reinforcing member having spaced laterally extending portions secured to the door rod and a vertically extending portion connecting said laterally extending portions to reinforce the outer edge, top and bottom portions of said flap.

In testimony whereof, we affix our signatures, in presence of two witnesses.

GUSTAV E. HOLMES.
JOHN M. BOSTROM.
AXEL G. BOSTROM.

Witnesses:
GUST ANDERSON,
ERNST ROSWELL.